United States Patent [19]

Parker

[11] Patent Number: 5,359,500
[45] Date of Patent: Oct. 25, 1994

[54] LIGHT PRODUCING ORNAMENT

[76] Inventor: Edwin S. Parker, 136 Terhune Ave. #D, Lodi, N.J. 07644-2806

[21] Appl. No.: 94,235

[22] Filed: Jul. 21, 1993

[51] Int. Cl.$^5$ .............................................. B60Q 1/26
[52] U.S. Cl. ................... 362/83.3; 362/190; 362/192
[58] Field of Search ...................... 362/83.3, 190, 192, 362/79, 72, 96, 294, 806

[56] References Cited

U.S. PATENT DOCUMENTS

| | | | |
|---|---|---|---|
| 1,913,765 | 12/1929 | Marshall | 362/79 |
| 2,124,222 | 5/1936 | Wihey | 362/72 |
| 3,174,552 | 12/1963 | Soucy, Jr. | 362/192 |
| 4,489,366 | 12/1984 | Rozniecki | 362/294 |
| 4,805,329 | 2/1989 | Tsai | 362/190 |

Primary Examiner—Richard R. Cole
Assistant Examiner—Sara Sachie Raab
Attorney, Agent, or Firm—Richard L. Miller

[57] ABSTRACT

A light producing ornament is provided for a vehicle which consists of a housing with a structure for mounting the housing to the vehicle. A generator is carried within the housing, while a rotatable shaft extends from the generator. A lamp assembly is mounted on a forward end of the housing, for emitting illumination and is electrically connected to the generator. A plurality of fan blades are on secured shaft at a rearward end of the housing, for turning the rotatable shaft when the vehicle is traveling forward, so that the generator can supply electrical energy to the illumination emitting lamp assembly.

4 Claims, 1 Drawing Sheet

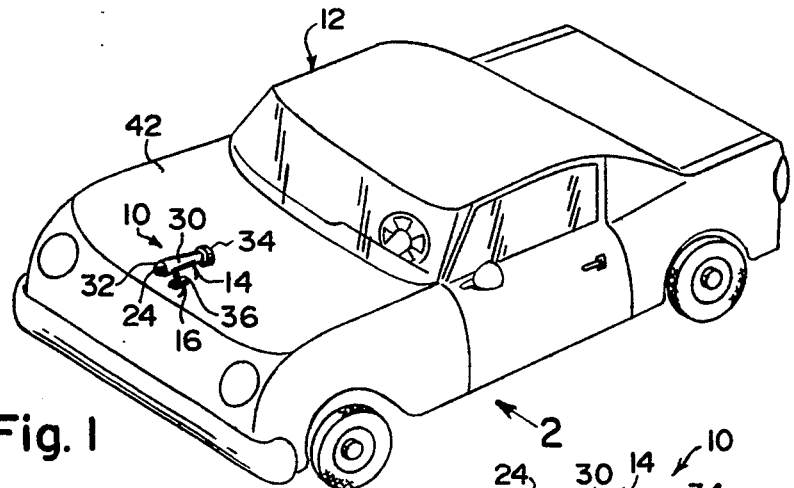
Fig. 1
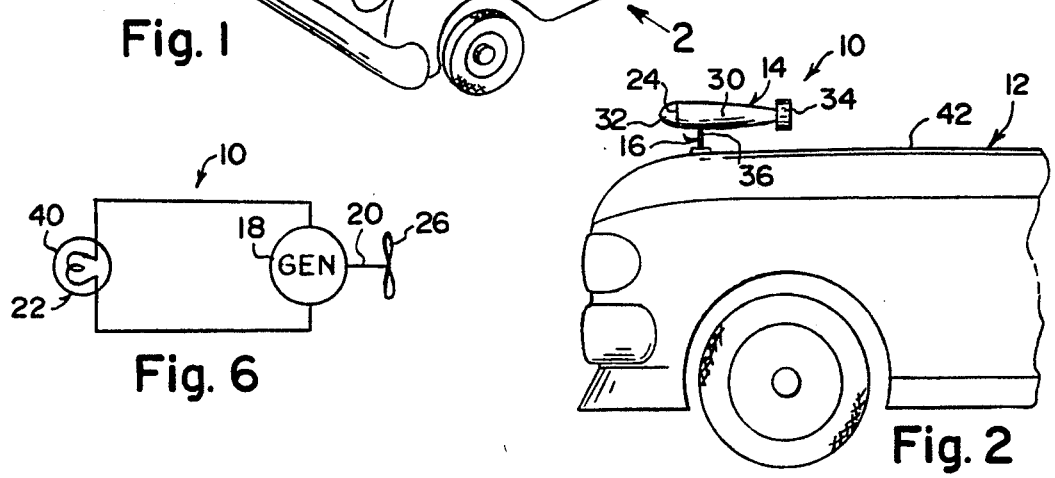
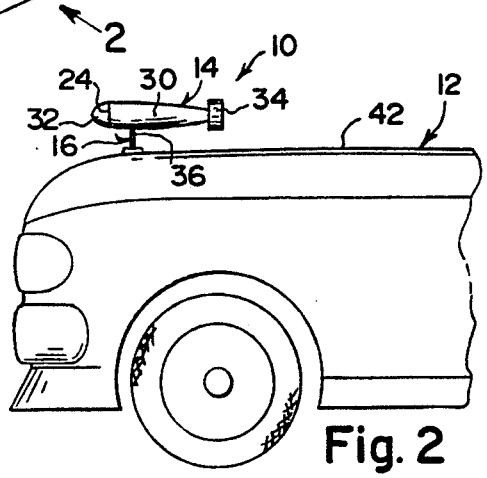
Fig. 2
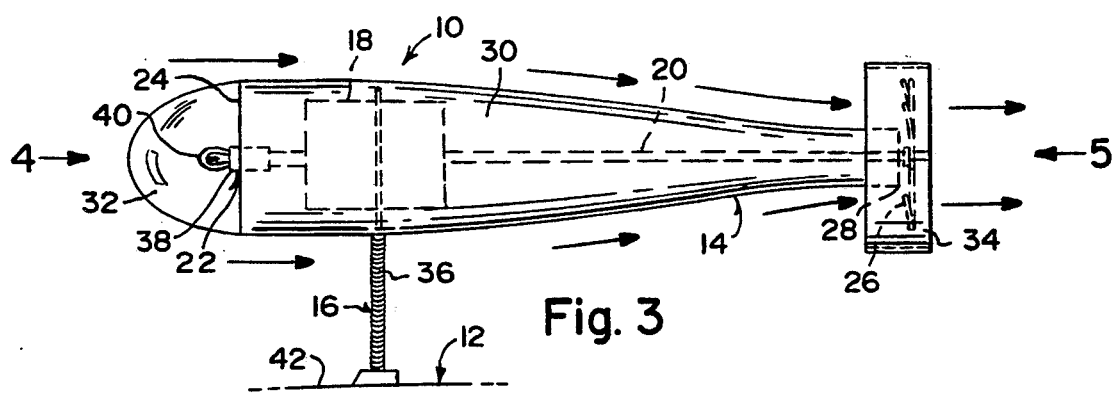
Fig. 6
Fig. 3
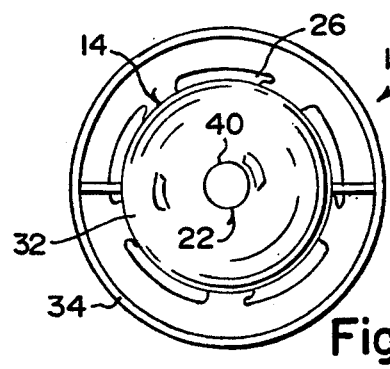
Fig. 4
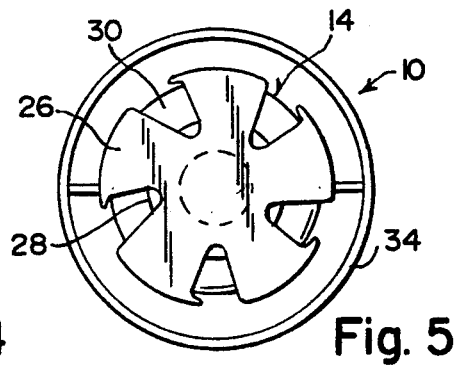
Fig. 5

LIGHT PRODUCING ORNAMENT

BACKGROUND OF THE INVENTION

This is a substitute application for application filed with Ser. No. 07/972,764 on the date of Nov. 5, 1992 now abandoned.

The instant invention relates generally to dynamo devices and more specifically it relates to a light producing ornament.

Numerous dynamo devices have been provided in prior art that are adapted to produce direct current by converting mechanical energy into electrical energy with electromagnetic induction. While these units may be suitable for the particular purpose to which they address, they would not be as suitable for the purposes of the present invention as heretofore described.

SUMMARY OF THE INVENTION

A primary object of the present invention is to provide a light producing ornament that will overcome the shortcomings of the prior art devices.

Another object is to provide a light producing ornament that can be mounted on a hood of a motor vehicle, whereby the forward movement of the motor vehicle will cause fan blades to rotate and operate a generator for illuminating a light emitting device.

An additional object is to provide a light producing ornament that contains a torpedo shaped housing with the fan blades located at a back end, the light emitting device located at a front end and the generator located therebetween.

A further object is to provide a light producing ornament that is simple and easy to use.

A still further object is to provide a light producing ornament that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The Figures on the drawings are briefly described as follows:

FIG. 1 is a diagrammatic perspective view of a vehicle with the instant invention installed thereon;

FIG. 2 is an enlarged elevational view taken in the direction of arrow 2 in FIG. 1 with parts broken away;

FIG. 3 is an enlarged diagrammatic elevational view of the instant invention per se;

FIG. 4 is a front elevational view taken in the direction of arrow 4 in FIG. 3 with parts broken away;

FIG. 5 is a rear elevational view taken in the direction of arrow 5 in FIG. 3 with parts broken away; and FIG. 6 is an electrical schematic diagram thereof.

DETAILED DESCRIPTION OF THE PREFERRED EMBODIMENTS

Turning now descriptively to the drawings, in which similar reference characters denote similar elements throughout the several views, FIGS. 1 through 5 illustrate a light producing ornament 10 for a vehicle 12 which consists of a housing 14 with a structure 16 for mounting the housing 14 to the vehicle 12. A generator 18 is carried within the housing 14, while a rotatable shaft 20 extends from the generator 18. A lamp assembly 22 is mounted on a forward end 24 of the housing 14, for emitting illumination and is electrically connected to the generator 18. A plurality of fan blades 26 are fixedly secured on the shaft 20 at a rearward end 28 of the housing 14, for turning the shaft 20, when the vehicle 12 is traveling forward. The generator 18 can supply electrical energy to the illumination light emitting assembly 22.

The housing 14 includes a torpedo shaped casing 30. A transparent dome shaped cover 32 fits over the illumination emitting light assembly 22 at the forward end 24. An annular guard protector 34 extends about the fan blades 26 at the rearward end 28.

The mounting structure 16 is an elongate bracket 36 for attaching the torpedo shaped casing 30 in an elevated position onto the vehicle 12. Air can pass about the torpedo shaped casing 30 to rotate the fan blades 26, when the vehicle 12 is traveling forward. The illumination emitting light assembly 22 contains a socket 38 and a light bulb or light emitting diode 40, which fits into the socket 38.

OPERATION OF THE INVENTION

The vehicle 12, as shown in the drawings, is an automobile. The elongate bracket 36 is affixed to a forward portion of an engine hood 42 on the automobile. The light producing ornament 10 can be utilized as a decorative component, especially at night. When the automobile travels forward, the air passing the torpedo shaped casing 30 will cause the fan blades 26 to turn, thereby rotating the shaft 20. The generator 18 will now supply electrical energy to the light emitting device 40 in the socket 38, so that the light emitting device will illuminate.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A light producing ornament for an automobile which comprises:

a torpedo shaped casing having a front end and a rear end and a portion of maximum cross-section adjacent to front end and tapering toward the rear end with a degree of tapering lessening adjacent the rear end which is of substantial uniform cross-section;

means for mounting said casing to the automobile;

a generator carried within said portion of said casing;

a rotatable shaft extending rearward from said generator;

means on the front end of said casing, for emitting illumination and electrically connected to said generator; and a plurality of fan blades on said rotatable shaft at the rear end of said housing, for rotating said rotatable shaft when the automobile is traveling forward, so that said generator can supply electrical energy to said illumination emitting means and, in an elevated position with the front end forward so that a slipstream can pass about said casing to rotate said fan blades when the automobile is traveling forward.

2. A light producing ornament as recited in claim 1, wherein said housing includes:
   a transparent dome shaped cover to fit over said illumination emitting means at said front end; and
   an annular guard protector that extends about said fan blades at said rear end.

3. A light producing ornament as recited in claim 1, wherein said illumination emitting means includes:
   a) a lamp socket; and
   b) a light bulb which fits into said lamp socket.

4. In combination a light producing ornament and an automobile which comprises:
   a torpedo shaped casing having a front end and a rear end and a portion of maximum cross-section adjacent to front end and tapering toward the rear end with a degree of tapering lessening adjacent the rear end which is of substantial uniform cross-section;
   means mounting said casing to the automobile;
   a generator carried within said portion of said casing;
   a rotatable shaft extending rearward from said generator;
   means on the front end of said casing, for emitting illumination and electrically connected to said generator; and
   a plurality of fan blades on said rotatable shaft at the rear end of said housing, for rotating said rotatable shaft when the automobile is traveling forward, so that said generator can supply electrical energy to said illumination emitting means and, in an elevated position with the front end forward so that a slipstream can pass about said casing to rotate said fan blades when the automobile is traveling forward.

* * * * *